(12) United States Patent
Tsuda et al.

(10) Patent No.: US 11,477,724 B2
(45) Date of Patent: Oct. 18, 2022

(54) SYSTEM INFORMATION FOR CELL SELECTION/RESELECTION BY AN AERIAL UE

(71) Applicant: Sony Corporation, Tokyo (JP)

(72) Inventors: Shinichiro Tsuda, Basingstoke (GB); Hideji Wakabayashi, Basingstoke (GB); Yuxin Wei, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 154 days.

(21) Appl. No.: 16/766,296

(22) PCT Filed: Nov. 22, 2018

(86) PCT No.: PCT/EP2018/082163
§ 371 (c)(1),
(2) Date: May 22, 2020

(87) PCT Pub. No.: WO2019/101837
PCT Pub. Date: May 31, 2019

(65) Prior Publication Data
US 2021/0037452 A1    Feb. 4, 2021

(30) Foreign Application Priority Data

Nov. 24, 2017 (EP) ..................... 17203662

(51) Int. Cl.
*H04W 48/00* (2009.01)
*H04W 48/16* (2009.01)
*B64C 39/02* (2006.01)
*H04W 36/08* (2009.01)

(52) U.S. Cl.
CPC .......... *H04W 48/16* (2013.01); *B64C 39/024* (2013.01); *H04W 36/08* (2013.01)

(58) Field of Classification Search
CPC ..... H04W 48/16; H04W 36/08; B64C 39/024
See application file for complete search history.

(56) References Cited

U.S. PATENT DOCUMENTS

| | | | |
|---|---|---|---|
| 2011/0319086 A1 | 12/2011 | Katori | |
| 2016/0234736 A1* | 8/2016 | Kubota | .................. H04L 12/18 |
| 2018/0324581 A1* | 11/2018 | Phuyal | .................. H04W 36/30 |
| 2020/0033849 A1* | 1/2020 | Yiu | ...................... G05D 1/0022 |
| 2020/0288390 A1* | 9/2020 | Wang | ..................... H04B 7/185 |

FOREIGN PATENT DOCUMENTS

| | | | | |
|---|---|---|---|---|
| CA | 3058513 A1 * | 11/2018 | .......... | B64C 39/024 |
| WO | WO-2016053426 A1 * | 4/2016 | ........ | H04W 36/0061 |
| WO | 2019/048127 A1 | 3/2019 | | |

OTHER PUBLICATIONS

International Search Report and Written Opinion dated Feb. 6, 2019 for PCT/EP2018/082163 filed on Nov. 22, 2018, 17 pages.

(Continued)

*Primary Examiner* — Khai M Nguyen
(74) *Attorney, Agent, or Firm* — Xsensus, LLP

(57) ABSTRACT

An infrastructure equipment comprising circuitry configured to transmit system information specific for aerial UEs, the system information specific for aerial UEs comprising assistance information for cell selection/reselection.

14 Claims, 11 Drawing Sheets

(56) References Cited

OTHER PUBLICATIONS

Huawei and Hisilicon, "Identification of air-borne drones," 3GPP TSG-RAN WG2 Meeting #98, R2-1705000, Hangzhou, China, May 15-19, 2017, 3 pages.

Deutsche Telekom, "Our view on the "Chiba issue"—RACH access failure," 3GPP TSG RAN WG2 #82, R2-131654, Fukuoka, Japan, May 20-24, 2013, 2 pages.

Mediatek Inc., "Discussion on NR RSSI measurement," 3GPP TSG-RAN WG4 Meeting #84bis, R4-1710672, Dubrovnik, Oct. 9-13, 2017, 5 pages.

Kyocera, et al. "Considerations for cell selection and reselection with UAVs," 3GPP TSG-RAN WG2 #99bis, R2-1710796, Prague, Czech Republic, Oct. 9-13, 2017, pp. 1-3.

Nokia and Nokia Shanghai Bell, "Mobility enhancements for UAVs—reference altitude," 3GPP TSG-RAN WG2 #100, R2-1713265, Reno, USA, Nov. 27-Dec. 1, 2017, 3 pages.

Huawei and Hisilicon, "Potential enhancements for drones in idle state," 3GPP TSG-RAN WG2 Meeting #100, R2-1713331, Resubmission of R2-1710409, Reno, United States, Nov. 27-Dec. 1, 2017, 3 pages.

Kyocera, et al. "Considerations for cell selection and reselection with UAVs," 3GPP TSG-RAN WG2 #100, R2-1713507, Revision of R2-1710796, Reno, USA, Nov. 27-Dec. 1, 2017, pp. 1-2.

Sony, "Location based mobility enhancements for UAVs," 3GPP TSG RAN WG2 Meeting #101, R2-1803129, Athens, Greece, Feb. 26-Mar. 2, 2018, 3 pages.

Huawei and Hisilicon, "Left issues of drones in idle state mode," 3GPP TSG-RAN WG2 Meeting #102, R2-1808339, revision of R2-1804650, Busan, Korea, May 21-25, 2018, 3 pages.

\* cited by examiner

```
SIB1-UAV
 L ..
 L CellSelectAssistenceInfo
 L ...

CellSelectAssistenceInfo
 L BaseStation1
    L cellID
    L latitude
    L longitude
    L Height
 L BaseStation2
    L cellID
    L latitude
    L longitude
    L Height
 L BaseStation3
    L cellID
    L latitude
    L longitude
    L height
```

Fig. 3

```
CellSelectAssistenceInfo
  └ BaseStation1
    └ cellID
    └ latitude
    └ longitude
    └ Height
    └ FD-MIMO-ENABLED
  └ BaseStation2
    └ cellID
    └ latitude
    └ longitude
    └ Height
    └ FD-MIMO-ENABLED
  └ BaseStation3
    └ cellID
    └ latitude
    └ longitude
    └ Height
    └ FD-MIMO-ENABLED
```

Fig. 9

SYSTEM INFORMATION FOR CELL SELECTION/RESELECTION BY AN AERIAL UE

CROSS-REFERENCE TO RELATED APPLICATIONS

The present application is based on PCT filing PCT/EP2018/082163, filed Nov. 22, 2018, which claims priority to EP 17203662.6, filed Nov. 24, 2017, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G. As the 5G system will be based on LTE or LTE-A, respectively, it is assumed that specific requirements of the 5G technologies will, basically, be dealt with by features and methods which are already defined in the LTE and LTE-A standard documentation.

Current technical areas of interest to those working in the field of wireless and mobile communications are known as the "Internet of Things", or IoT for short, and "Machine to Machine Communication" (M2M), or Machine Type Communication (MTC). The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

Unmanned Aerial Vehicles (UAV), more commonly referred to as "Drones", are aircrafts that operate with various degrees of autonomy, e.g. under remote control by a human operator or autonomously by onboard micro controller. The remote control of drones may be based on a usage of cellular networks in a regulatory manner. Consequently, a support of cellular communication could be foreseen for drones. A drone may carry a legal UE, which is certified for aerial usage, or, alternatively, a drone may carry a UE that is only certified for terrestrial operation, e.g. a smart phone.

According to 3GPP TSG-RAN WG2 Meeting #98, R2-1705000, Hangzhou, China, 15-19 May 2017, it has been agreed that both command and control and application data of drones using LTE connectivity are within the scope of the system information (SI).

According to 3GPP TSG-RAN R2-1710796 ("Considerations for cell selection and reselection with UAVs"), WG2 Meeting #98, R2-1705000, Hangzhou, China, 15-19 May 2017, once an aerial vehicle is flying well above the BS antenna height, the UL signal from the aerial vehicle becomes more visible to multiple cells due to line-of-sight propagation conditions. The UL signal from an aerial vehicle increases interference in the neighbouring cells. R2-1710796 thus proposes that there should be an option for cells to configure system information with cell selection/reselection related system information specifically for aerial UEs.

In view of this background, an efficient mobility management for aerial UEs mitigating interference with terrestrial UEs is needed.

SUMMARY

According to a first aspect the disclosure provides an infrastructure equipment comprising circuitry configured to transmit system information specific for aerial UEs, the system information specific for aerial UEs comprising assistance information for cell selection/reselection.

According to a further aspect the disclosure provides an infrastructure equipment comprising circuitry configured to repeatedly change an inclination angle of a main lobe for reception of random access requests from aerial UEs.

According to a further aspect the disclosure provides an electronic device comprising circuitry configured to receive system information specific for aerial UEs, the system information specific for aerial UEs comprising assistance information for cell selection/reselection.

According to a further aspect the disclosure provides a method comprising transmitting or receiving system information specific for aerial UEs, the system information specific for aerial UEs comprising assistance information for cell selection/reselection.

According to a further aspect the disclosure provides a method comprising repeatedly changing an inclination angle of a main lobe for reception of random access requests from aerial UEs.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 shows an embodiment of assistance information for cell selection that is transmitted as system information from a base station;

FIG. 9 shows an embodiment of assistance information for cell selection that is transmitted as system information from a base station, the assistance information comprising information indicating if the FD-MIMO function is implemented or not.

DETAILED DESCRIPTION OF EMBODIMENTS

Figure 1:
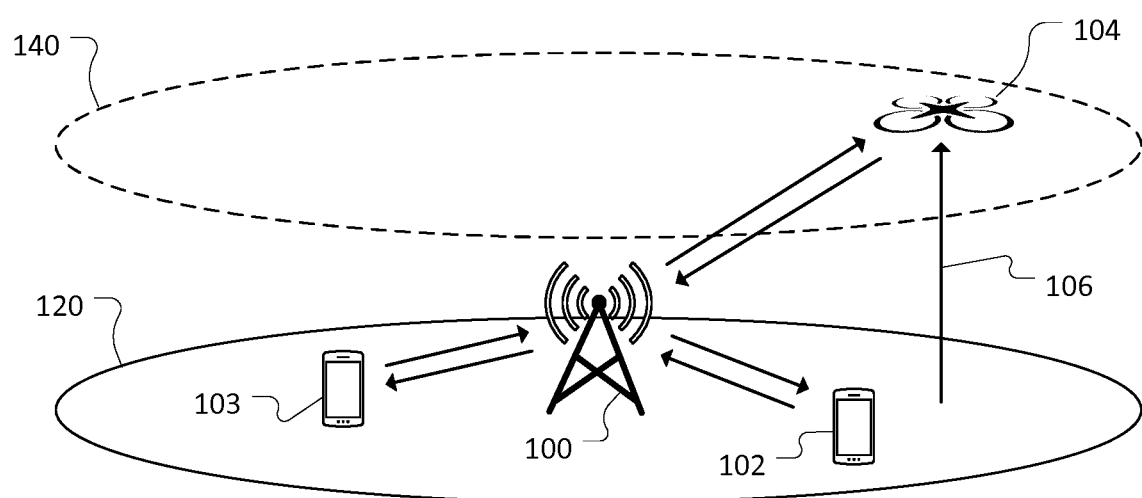
FIG. 1 shows an embodiment in which an eNB that is designed based on currently deployed base stations for cellular systems builds a different type of cell coverage ("areal cell coverage") for aerial UEs in addition to the normal cell coverage for terrestrial UEs.

The embodiments disclose an infrastructure equipment comprising circuitry configured to transmit system information specific for aerial UEs, the system information specific for aerial UEs comprising assistance information for cell selection/reselection.

The infrastructure equipment may also be referred to as a base station, network element such as an entity of a core network, an enhanced Node B (eNodeB, or eNB) or a coordinating entity for example, and may provide a wireless access interface to one or more communications devices within a coverage area or cell. The infrastructure equipment may for example be any entity of a telecommunications system, e.g. an entity of a New Radio Access Technology Systems.

A User Equipment (UE) may be any device that is related to an end-user or to a terminal to communicate in e.g. a Universal Mobile Telecommunications System (UMTS) and 3GPP Long Term Evolution (LTE, or aLTE) system. The UE may support the New Radio Access Technology Systems in addition to the legacy system such as LTE, and other advancements.

An aerial UE may for example be an UE that is provided in, on or at an aerial vehicle. An aerial device may for example be an Unmanned Aerial Vehicles (UAV) (a "Drone"), or aircrafts that operate with various degrees of autonomy, e.g. under remote control by a human operator or autonomously by an onboard micro controller. An aerial UE may be a mobile communications device that is configured to communicate data via the transmission and reception of signals representing data using a wireless access interface. In the context of this application, the term aerial UE is also used for an electronic device that is autonomously or semi-autonomously operating in an aerial device, without the operator (or "user") of the device being required to be located at or close to the device. The term User Equipment (UE) thus also relates to equipment where the user is located remote to the equipment.

Circuitry of an infrastructure equipment may include at least one of: a processor, a microprocessor, a dedicated circuit, a memory, a storage, a radio interface, a wireless interface, a network interface, or the like, e.g. typical electronic components which are included in a base station, such as an eNodeB.

System information (SI) may be broadcasted by an eNB over logical channel BCCH. This logical channel information may for example be further carried over transport channel BCH or carried by DL-SCH. System Information may be transmitted in the form of blocks (SIBs) that are grouped in SI containers. SIBs may for example be transmitted using BCCH mapped on DL-SCH which in turn mapped on PDSCH. System information may for example be changed every BCCH modification period.

Cell selection may relate to initial access of an aerial UE or terrestrial UE to a mobile communciations network. For example, in LTE a UE performs certain steps before it can receive or transmit data. These steps can be categorized in cell search and cell selection, derivation of system information, and random access. After the initial access procedure, the terminal is able to receive and transmit its user data. Cell (re)selection may also be necessary after a radio link failure.

The assistance information for cell selection/reselection may comprise information identifying the location of neighbouring base stations. For example, the infrastructure equipment may include information identifying any base station in its vicinity that might act as a candidate for random access trials of an aerial UE within the reception range of the system information. The information identifying the location of neighbouring base stations may for example comprise geographical coordinates, height and a cell ID of the respective base station. Still further the information identifying the location of neighbouring base stations may also comprise information identifying the location of the infrastructure equipment itself.

The assistance information for cell selection/reselection comprises information indicating whether or not a base station supports beam forming.

The assistance information for cell selection/reselection may comprise information identifying radio resources among uplink radio resources for which tilting of the main lobe is enabled.

System information that is specific for aerial UEs may be explicitly or implicitly addressed to aerial UEs. For example, aerial UEs may be capable of identifying system information that is specific for aerial UEs and may be capable of deciding that this information specific for aerial UEs is for the use by aerial UEs. Also, terrestrial UEs may be capable of identifying system information specific for aerial UEs and they may decide to skip decoding or abandon from using such system information that is specific for aerial UEs.

For example, the system information for aerial UEs comprising the assistance information for cell selection/reselection may be transmitted in a system information block that is dedicated for use by aerial UEs only, e.g. a system information block defined in the standard as SIB1-UAV or the like. Alternatively, the system information specific for aerial UEs comprising assistance information for cell selection/reselection may for example transmitted in SIB1 which contains information regarding whether or not UE is allowed to access the LTE cell. For example, specific information elements of SIB1 may be defined in the standard as dedicated for use by aerial UEs only. Alternatively, an information element (e.g. a flag) might be included that explicitly indicates that system information is specific for aerial UEs.

The system information for aerial UEs comprising the assistance information for cell selection/reselection may also be transmitted in addition ("as a delta") to general system information that is dedicated for use by aerial UEs and terrestrial UEs.

The embodiments also disclose an infrastructure equipment comprising circuitry configured to repeatedly change an inclination angle of a main lobe for reception of random access requests from aerial UEs.

The infrastructure equipment may for example be configured to change an inclination angle of a main lobe for reception of random access requests from aerial UEs using beam forming techniques. For example, the circuitry of the infrastructure equipment may be configured to define a beam-forming directivity by setting weights for multiple antenna. In this way, the inclination angle of a main lobe may be configured. By beam-forming technology the circuitry of the infrastructure equipment may be configured to transmit reference signals to or receive reference signals from an aerial UE. This tilting of the main lobe may for example be done by means of beam forming in FD-MIMO (Free Dimension MIMO).

For example, the circuitry may be configured to perform a cyclic ramping of the main lobe.

Alternatively, the circuitry may be configured to change the azimuth angle of the main lobe randomly.

The circuitry may be configured to change the azimuth angle of the main lobe for a predefined set of RACH resource blocks, or for all RACH resource blocks.

The embodiments disclosed below in more detail also provide an electronic device comprising circuitry configured to receive system information for aerial UEs, the system information for aerial UEs comprising assistance information for cell selection/reselection. The electronic device may for example be an aerial UE, i.e. an UE that is located in or at an aerial vehicle such as a drone or the like.

Circuitry of an electronic device (e.g. aerial UE) may include at least one of: a processor, a microprocessor, a dedicated circuit, a memory, a storage, a radio interface, a wireless interface, a network interface, or the like, e.g. typical electronic components which are included in a user equipment.

The assistance information for cell selection/reselection may be configured as described above with regard to the transmission of assistance information for cell selection/reselection by an infrastructure equipment.

The circuitry may be configured to perform the cell selection/reselection based on the assistance information and according to a criterium.

The assistance information for cell selection/reselection may comprise information identifying the location of base stations, and the circuitry of the electronic device may be configured to determine a distance between the electronic device and each base station identified in the assistance information.

The circuitry may further be configured to perform cell selection/reselection based on the distances between the electronic device (e.g. aerial UE) and the respective base stations.

The circuitry may be configured to perform cell selection/reselection based on the assistance information if a criterium a fulfilled and to perform conventional cell selection/reselection if the criterium is not fulfilled. This criterium may for example depend on the height of the electronic device.

The embodiments also describe a method comprising transmitting or receiving system information for aerial UEs, the system information for aerial UEs comprising assistance information for cell selection/reselection.

The embodiments also describe a method comprising repeatedly changing an inclination angle of a main lobe for reception of random access requests from aerial UEs.

The methods may comprise any of the aspects described above with regard to the operation of an infrastructure equipment and with regard to an electronic device of the embodiments. The method may also comprise any of the aspects described below in more detail with regard to the operation of an eNB and/or a network entity, and with regard to an aerial UE of the embodiments.

Areal Cell Coverage

Cellular systems are designed by deploying eNBs so that each cell coverage for terrestrial UEs can be regarded as a unit for mobility management such as handover in connected mode or cell selection/reselection in idle mode. This cell coverage for terrestrial UEs can be treated as static coverage provided by transmission of cell specific reference signal (CRS) or Common Reference Signal.

Areal cell coverage for aerial UEs can be a static coverage similar to that for terrestrial UEs.

However, from a perspective of minimization of interference to neighbouring cells and efficient usage of radio resources, areal cell coverage for aerial vehicles can be provided in a dynamic manner.

In the embodiments described below in more detail, the term "areal cell coverage" is used to refer to a second coverage ("aerial cell coverage") that is provided by an eNB to aerial UEs, in addition to a first coverage (or "terrestrial cell coverage") that is provided by the eNB to terrestrial UEs.

FIG. 1 discloses an embodiment in which an eNB 100 that is designed based on currently deployed base stations for cellular systems builds a different type of cell coverage ("aerial cell coverage") for aerial UEs in addition to the normal cell coverage ("terrestrial cell coverage") for terrestrial UEs. In FIG. 1, eNB 100 provides terrestrial UEs 102, 103 with a cell coverage 120 for terrestrial UEs and eNB 100 provides an aerial vehicle 104 comprising an aerial UE with a cell coverage 140 for aerial UEs. This "areal cell coverage" may adapt to the varying size of coverage provided by eNB 100 depending on the height 106 of flying aerial vehicle 104.

As the number of visible cells may depend on the height 106 of aerial vehicle 104, in connected mode, the transmission power from eNB 100 and/or from aerial vehicle 104 may be controlled depending on the height of aerial vehicle 104. For example, the transmission power from eNB 100 and/or from aerial vehicle 104 may be controlled in a way that the area of areal cell coverage provided by eNB 100 remains almost the same size regardless of the height 106 of aerial vehicle 104.

Accordingly, the same deployment philosophy for mobility management may be applied regardless of height of aerial vehicle 104. This may allow eNBs to be geometrically deployed so that efficient mobility can be performed.

Most of the aerial UEs are equipped with a GNSS (Global Navigation Satellite System) like GPS or any other accurate positioning function. In order to allow for a dynamic control of the areal cell coverage provided by the eNB, an aerial vehicle 104 may report its altitude (height) to eNB 100. For example, aerial vehicle 104 can report a value of altitude measured via GPS (Global Positioning System) or a height measured via pressure sensor to eNB 100. The eNB may have a database storing a relation between areal cell coverage and the coordination of eNB position. For example, the site information database stores the cell ID, eNB coordination, cell radius, transmission power, antenna configuration, and so on. This information is originally for terrestrial cell coverage, but it could be useful for areal carrier. When an eNB receives the position of an aerial vehicle, the eNB calculates the cell coverage area according to the information in the database. Then, the eNB checks whether the aerial vehicle is within the calculated cell coverage area or not. Alternatively, the UE may receive a subset of that database in a neighbor area of its current position from the network in advance. For example, the site database may accommodate all eNBs information. It may be too large to store in the UE. The site database picks up the information of nearest eNB from the current aerial vehicle position and its neighbor eNBs of the nearest eNB, which is called here a "neighbor area". The eNB may send the selected eNBs information from the data base to aerial vehicle. The aerial vehicle may calculate the cell coverage of a nearest eNB and its neighbor eNBs as well. This may be the calculated cell coverage, also called "zone".

An eNB as described above may thus have the latest/accurate location of aerial UEs. eNBs regularly update the location information to MME or to a location server of aerial UEs. MME/location server may provide this information to an external server of air traffic control. Vice versa, the external server might send the information/direction from traffic control to aerial UE via MME.

Arial UEs after Radio Link Failure (RLF)

Base stations are normally designed for the use with terrestrial UEs and are normally not specifically deployed for aerial UEs, e.g. by taking care of effects from buildings or some obstacles. That is, aerial UEs may have a higher possibility to face radio link failures as compared to terrestrial UEs.

In general, in the case that a UE faces a radio link failure (RLF), the UE initiates the RRC connection re-establishment procedure, provided that security is active. If security is not active when RLF occurs, the UE moves to idle mode.

To attempt the RRC connection re-establishment procedure, the UE starts T311 timer and performs cell selection. However, as described in 3GPP TSG-RAN R2-1710796, it is possible that the aerial UE receives the system information from a base station that is not the nearest one.

Cell selection without taking care specially for aerial UEs could thus result in that during cell selection an aerial UE does not select the nearest base station. This might generate interference problems for an aerial UE or the terrestrial UE in the random access procedure, i.e. the aerial UE or another terrestrial UE, due to the interference problems, might have difficulties to send an RRCConnectionReestablishmentRequest message.

Figure 2:
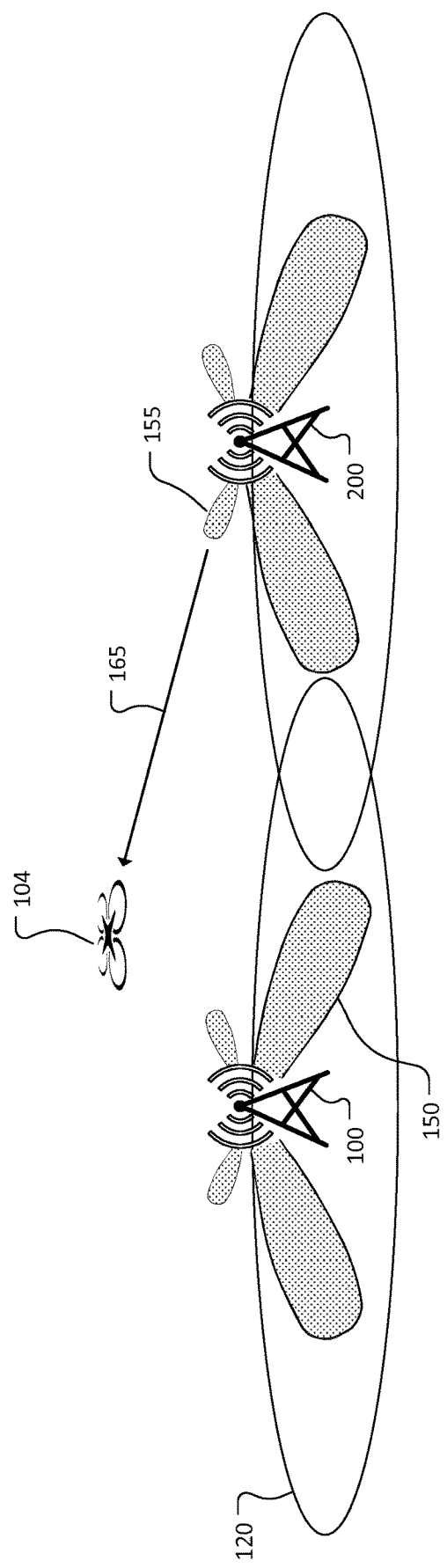
FIG. 2 schematically shows an aerial UE that selects a neighbouring base station as a serving cell according to a conventional cell selection/reselection.

FIG. 2 schematically shows an aerial UE that selects a neighbouring base station as a serving cell according to a conventional cell selection/reselection. As shown in FIG. 2, an aerial UE 104 may select a neighbouring base station 200 as a serving cell according to a conventional cell selection/reselection and receive the system information from this neighbouring base station 200 via side lobe 155, i.e. not from a nearest base station 100 via its main lobe 150. If the aerial UE 104 performs connection establishment or connection re-establishment based on this conventional cell selection/reselection, the aerial UE 104 starts random access transmission towards the neighbouring base station 200. Since a transmission power on this random access could be higher than that from a terrestrial UE, so as to reach to the neighbouring base station, this may cause serious interference to terrestrial UEs in the coverage of a base station 100 and the neighbouring base station 200.

This may be a similar issue as the issue which is known as "Chiba" issue from terrestrial UEs. The "Chiba" issue is described, for example, in 3GPP TSG-RAN R2-1710796 ("Our view on the "Chiba issue"—RACH access failure"), WG2 Meeting #82, R2-131654, Fukuoka, Japan, 20-24 May 2013. In the "Chiba" issue, it is considered the specific case that the downlink quality is better than the uplink quality. In such a case, even if a terrestrial UE could receive enough down link quality from a base station, a random access transmission transmitted by the terrestrial UE might be too week to reach the base station/cell selected by cell selection. This could for example happen due to a large mismatch between uplink and downlink quality (i.e. poor reciprocity). One of solution for the "Chiba" issue is that the number of random access retransmissions is limited to a maximum number. A selected cell will be changed to the next higher ranking cell after the number of random access trials reaches the maximum number. As the current deployment of base stations has not considered introduction of the aerial UEs, this kind of large mismatch between uplink and downlink due to directivity of the antenna towards the aerial UEs may frequently happen. This may in particular happen because communication via a side lobe may be expected to have worse reciprocity than that via a main lobe.

Assistance Information within System Information for Aerial UEs

As described above in more detail, it can here be assumed that most of the aerial UEs are equipped with a GNSS (Global Navigation Satellite System) like GPS or any other accurate positioning function.

FIG. 3 shows an embodiment of assistance information for cell selection that is transmitted as system information from a base station (e.g. neighbouring base station 200 in FIG. 2) to an aerial UE (e.g. 104 in FIG. 2). In this example, the assistance information for cell selection CellSelectAssistenceInfo is transmitted as part of SIB1-UAV which is a system information block that is specific for aerial UEs. The CellSelectAssistenceInfo comprises an information element BaseStation1 that describes a first base station, an information element BaseStation2 that describes a second base station, and an information element BaseStation3 that describes a third base station. Information element BaseStation1 comprises an information element cellID that describes the cell id of the first base station and thus uniquely identifies the first basestation. Information element BaseStation1 further comprises information elements latitude, longitude and height that describe the geographical location of the first base station. Information element BaseStation2 comprises an information element cellID that describes the cell id of the second base station and thus uniquely identifies the first base station. Information element BaseStation2 further comprises information elements latitude, longitude and height that describe the geographical location of the second base station. Information element BaseStation3 comprises an information element cellID that describes the cell id of the third base station and thus uniquely identifies the third base station. Information element BaseStation3 further comprises information elements latitude, longitude and height that describe the geographical location of the third base station.

If the system information for the aerial UEs comprises, as described above, assistance information for identifying base stations that are in its vicinity, an aerial UE, based on this assistance information and based on a position information detected by the GNSS or any other accurate positioning function of the aerial UE can perform a cell selection/reselection procedure according to the information contained in the system information. For example, for an aerial UE the cell selection/reselection can be based on the distance between the aerial UE and each base station identified in the assistance information.

Figure 4:
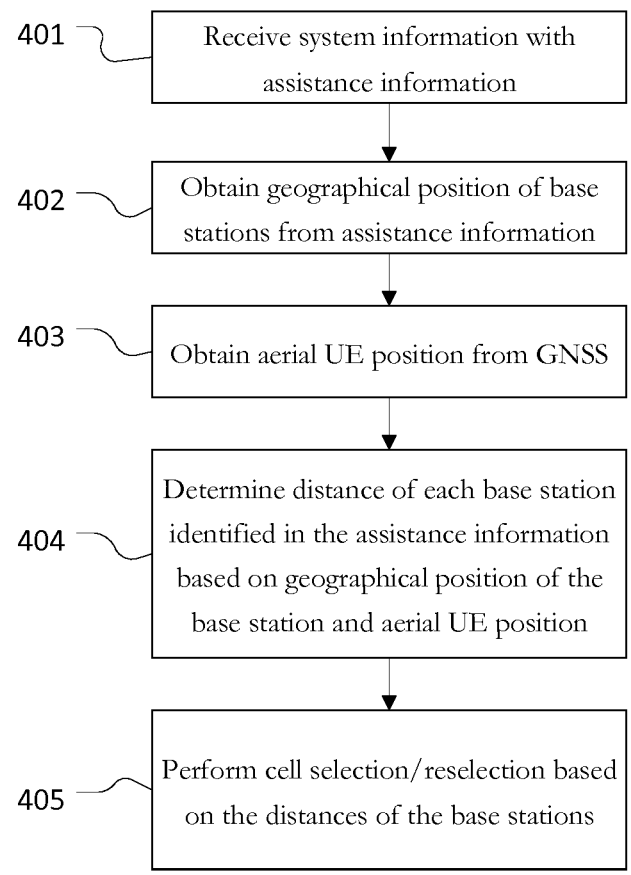
FIG. 4 shows an exemplifying process of performing the cell selection/reselection based on assistance information obtained within system information.

FIG. 4 shows an exemplifying process of performing the cell selection/reselection based on assistance information obtained within system information. At 401, the aerial UE receives system information with assistance information from a base station, The base station may for example be a base station which has a good downlink quality. At 402, the aerial UE obtains the geographical position of base stations identified in the assistance information. At 403, the aerial UE obtain its own position as aerial UE position from GNSS. At 404, the aerial UE determines the distance of each base station identified in the assistance information based on the geographical position of the base station and the aerial UE position (its own position). At 405, the aerial UE performs cell selection/reselection based on the distances of the base stations.

Here, this selection scheme based on distance between the aerial UE and each base station can be applied to a measurement for mobility management in connected mode. In this case, a criteria for the aerial UE to select candidate target base stations/cells for measurement can be configured via an RCCConnectionReconfiguration message upon connection establishment or handover procedure.

If the system information for the aerial UEs includes the assistance information, as described above, this allows the nearest base station to receive the random access transmitted from the aerial UE via a main lobe as far as possible. That is, other than in the case where an aerial UE performs cell selection/reselection to identify the nearest base station and sends RRCConnectionReestablishmentRequest message without any care if it is an aerial UE or not, if assistance information for aerial UEs is taken into account, the random access to send this message does not cause interference as mentioned above, since the nearest base station is able to receive this random access transmission via main lobe.

Furthermore, the system information for the aerial UEs can include, as assistance information, an information on maximum power or maximum retransmissions for sending a random access message such as RRCConnectionReestablishmentRequest message or the like from the aerial UE.

As another embodiment, dedicated RACH resources (PRACH resources or preambles) can be identified in the system information to point the aerial UE to specific resources, e.g. to a RACH resource that is configured for tilting a main lobe as described below in more detail.

Preferably this introduction of the assistance information (system information for aerial UEs) does not impose any additional load on the terrestrial UEs. As a terrestrial UE or an aerial UE can distinguish the general system information for the terrestrial UE from the system information for the aerial UE, the terrestrial UE may only receive the general system information for the terrestrial UE and the aerial UE may receive the system information for the terrestrial UE and the aerial UE.

As another embodiment, the system information for the aerial UE may be configured to be independent from general system information in the form of i.e. SIB1-UAV. So the terrestrial UEs do not have to bother to receive the system information for the aerial UE.

As another embodiment, the system information for the aerial UE, e.g. the assistance information described above, can be provided in addition ("as a delta") to the general system information.

Figure 5:
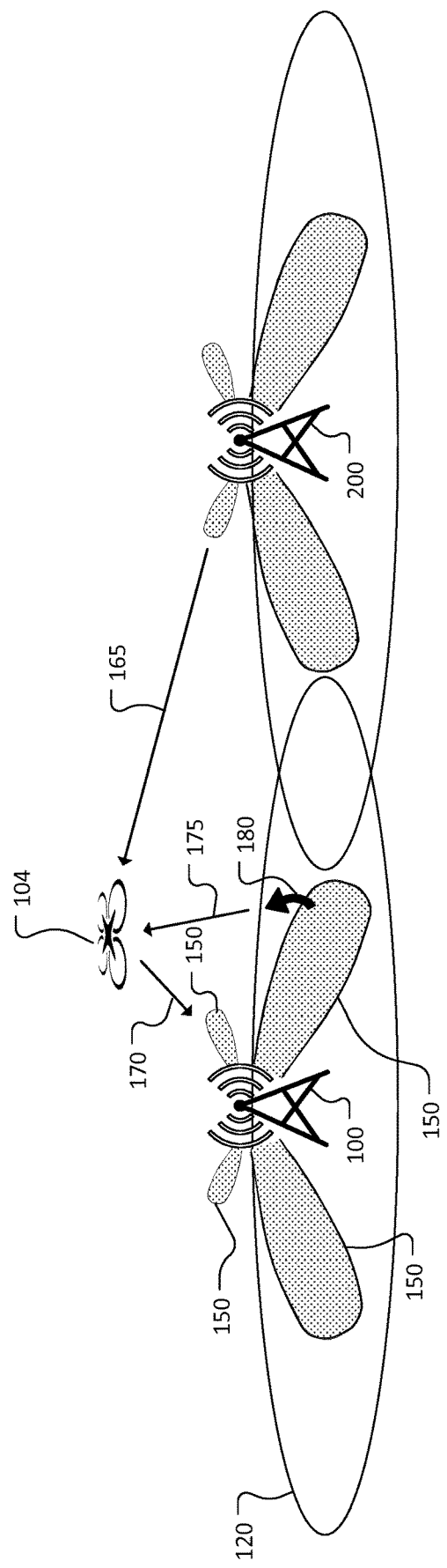
FIG. 5 schematically describes a procedure of connection establishment or re-establishment performed by an aerial UE.

Procedure of Connection Establishment or Re-Establishment Performed by the Aerial UE FIG. 5 schematically describes a procedure of connection establishment or re-establishment performed by an aerial UE.

As a first step of the procedure, aerial UE 104 performs a conventional cell selection/reselection. This conventional cell selection/reselection is the same as the one that a terrestrial UE performs.

As a next step of the procedure, which is indicated by arrow 165, the aerial UE 104 receives system information for aerial UEs (e.g. the assistance information described above) via base station 200 based on the conventional cell selection/reselection that results from the first process.

As a next step of the procedure, the aerial UE 104 performs a cell selection/reselection according to a criterium based on the system information for the aerial UE. Based on this cell selection/reselection, the aerial UE 104 identifies and selects a base station 100, e.g. as a nearest base station.

As a next step of the procedure, which is indicated by arrow 170, the aerial UE 104 sends a request of connection establishment or re-establishment via the random access procedure to the base station 100, which is identified by the aerial UE 104 as the result of cell the selection/reselection.

As a next step of the procedure, which is indicated by arrow 175, the base station 100 receives and acknowledges the request of connection establishment or reestablishment. This reception of the request of connection establishment or reestablishment from the aerial UE may happen with a main lobe being tilted (180 in FIG. 5) towards an upper angle, as it is described below in more detail.

The procedure of cell selection/reselection according to a criterium based on the system information for the aerial UE shown in FIG. 5 can be triggered as far as a value detected by any sensor or devices equipped with the aerial UE meets a condition (e.g. a height of the aerial UE reaches over 50m). This criterium may be configured by the network or it may be predetermined.

Figure 6:
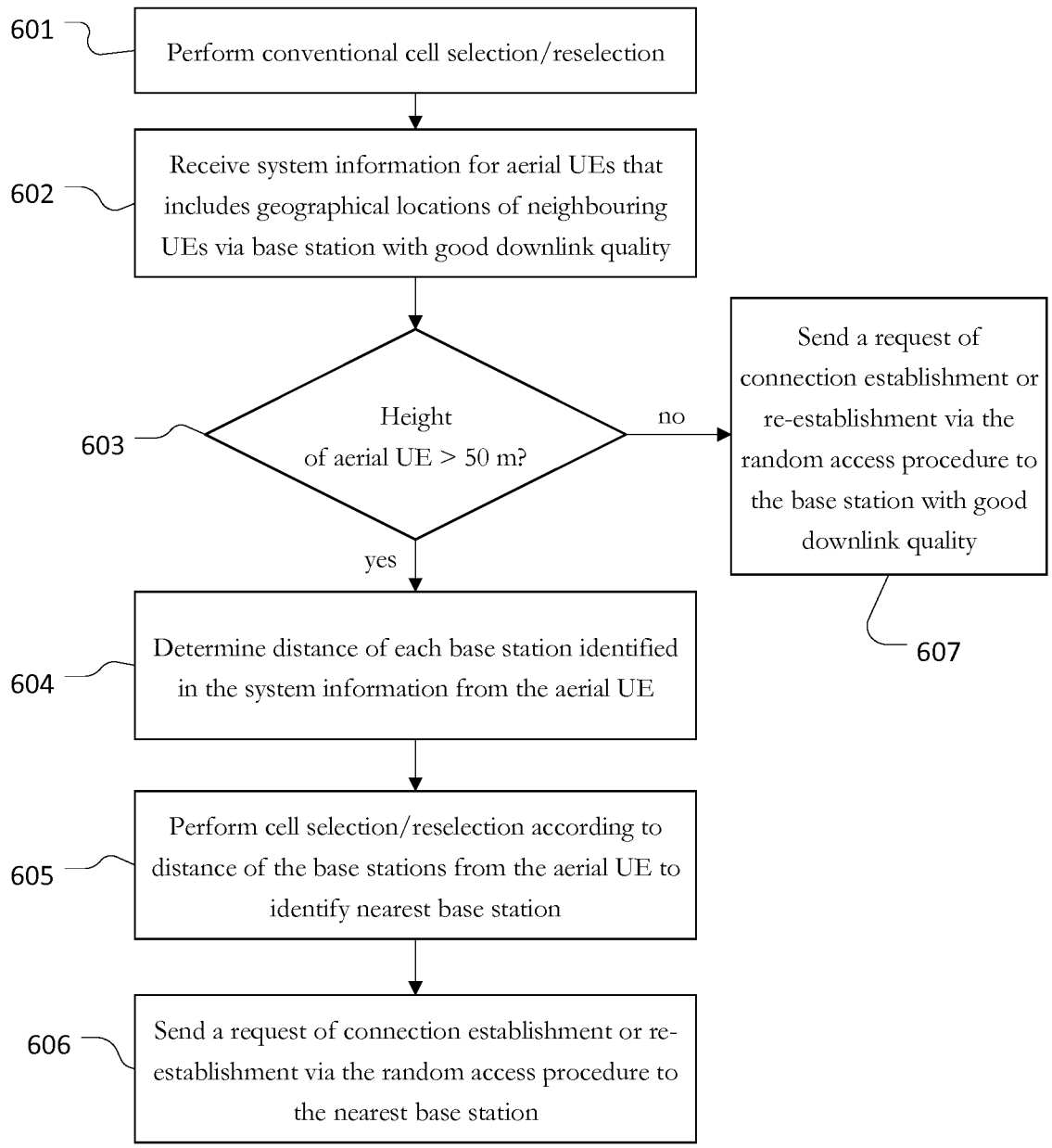
FIG. 6 shows an embodiment of a procedure of connection establishment or re-establishment performed by an aerial UE from the perspective of the aerial UE.

FIG. 6 shows an embodiment of a procedure of connection establishment or re-establishment performed by an aerial UE from the perspective of the aerial UE. At 601, the aerial UE performs conventional cell selection/reselection in order to identify a base station with e.g. good downlink quality. At 602, the aerial UE receives system information for aerial UEs that includes geographical locations of neighbouring UEs via the base station with good downlink quality. At 603, the aerial UE determines if its height is over 50 m. If it is determined at 603 that the height of the aerial UE is over 50 m, the procedure proceeds at 604. At 604, the aerial UE determines, based on the geographical locations of the base stations, the distance of each base station identified in the system information from the aerial UE. At 605, the aerial UE performs cell selection/reselection according to distance of the base stations from the aerial UE to identify nearest base station. At 606, the aerial UE sends a request of connection establishment or re-establishment via the random access procedure to the nearest base station. That is, the aerial UE performs cell selection/reselection based on the system information for aerial UEs. If, however, it is determined at 603 that the height of the aerial UE is not over 50 m, the procedure proceeds at 607. At 607, the aerial UE send a request of connection establishment or re-establishment via the random access procedure to the base station with good downlink quality. That is, the aerial UE performs the cell selection/reselection in the conventional way.

The embodiments disclosed above thus present efficient operation for aerial vehicles under a cellular system optimized for terrestrial UEs with small impact on the current system deployment. Most of the operation cases for the aerial UEs may be in connected mode so as to exchange signals relating to command and control. But support of idle mode should be necessary for connection re-establishment after radio link failure or the like. It may be an efficient approach that a system information specifically for the aerial UE supports assistance information related to cell selection/reselection for the aerial UEs. Aerial UEs may thus perform cell selection/reselection based on a position of the aerial UE.

Transmission Power Ramping Scheme for Random Access Transmission

One of the significant issues with regard to transmissions from an aerial UE is that transmissions from the aerial UE should reach further than transmissions from a terrestrial UE. A power ramping scheme of random access transmission may be applied during a transmission on configured RACH resources for the aerial UEs. However, increasing the transmission power may result in increased interference issues. A network may thus prefer reducing the maximum power of random access transmission from the aerial UE or/and give up usage of power ramping topology so as to reduce any risk of interference with the terrestrial UEs. An alternative to a transmission power ramping scheme is described below in more detail.

Main Lobe Ramping Scheme for Random Access Transmission

Instead of or in addition to using a power ramping of random access transmissions a ramping of the angle of the main lobe can be configured for specific RACH resources.

As mentioned with regard to arrow 175 of FIG. 5, in order that the base station 100 can efficiently receive the request of connection establishment or re-establishment transmitted by the aerial UE in idle mode via the random access procedure, the base station 100 can tilt a main lobe towards the aerial UE. This tilting of the main lobe may for example be done by means of beamforming in FD-MIMO (Free Dimension MIMO).

Figure 7:
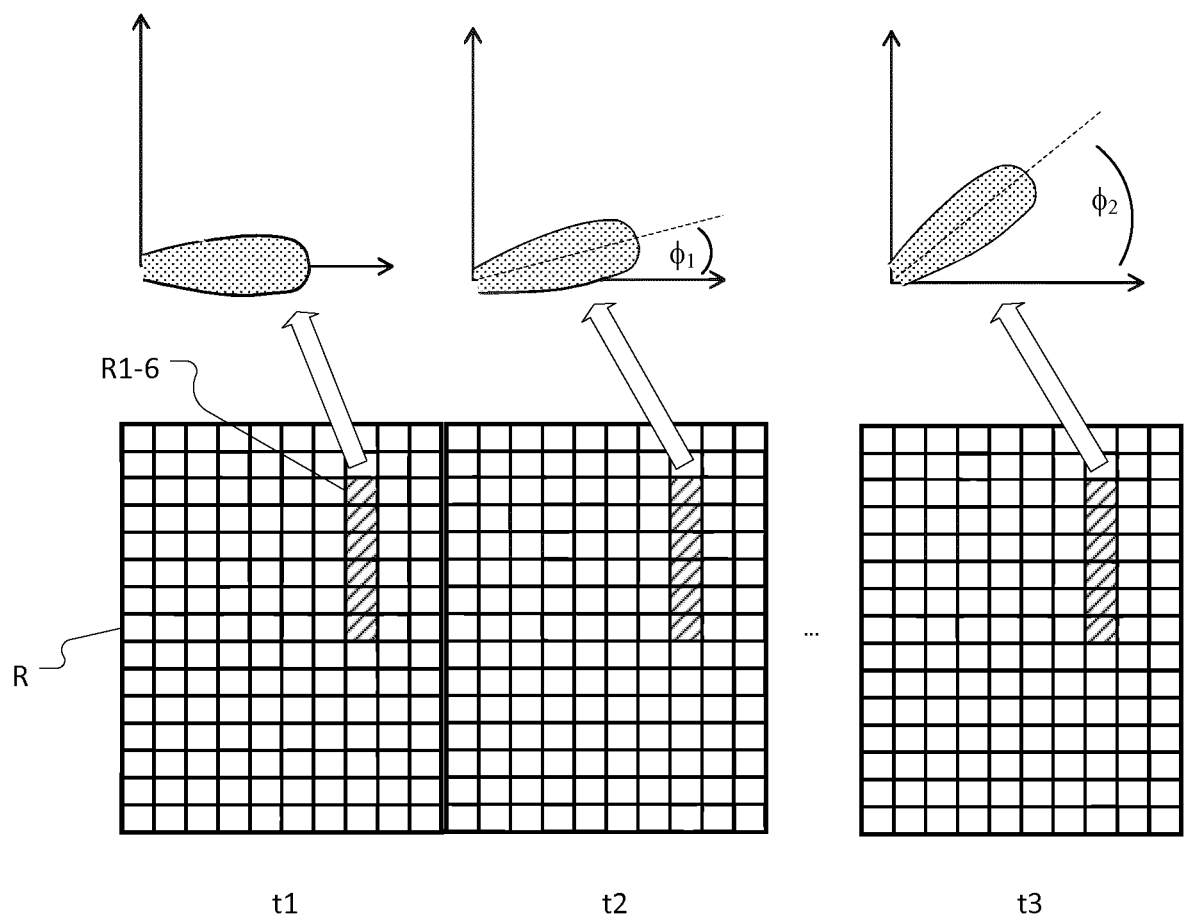
FIG. 7 shows a block of RACH resources at three different points in time and resource blocks that are configured for aerial UEs with tilting of the main lobe.

FIG. 7 shows a block of RACH resources R at three different points in time t1, t2, and t3. Resource blocks R1-R6 are configured for aerial UEs with tilting of the main lobe. At time t1, the main lobe is not tilted, i.e. the inclination angle (angle above the horizon) is zero. This orientation of the main lobe may for example correspond to the standard orientation of a main lobe of base station that is positioned close to ground and that serves terrestrial UEs. At time t2, for RACH resources R1-R6, the main lobe is tilted from the horizontal plane according to a first inclination angle $\phi_1$. At time t3, for RACH resources R1-R6, the main lobe is tilted from the horizontal plane according to a second inclination angle $\phi_2$. An aerial UE which is flying high may succeed with a RACH attempt at time t3 where the main lobe is tilted strongly towards high flying UEs. An aerial UE which is on the ground may succeed with a RACH attempt at time t1 where the main lobe is not tilted. In FIG. 7, only resource blocks R1-R6 are configured for aerial UEs with tilting of the main lobe. In other embodiment, other sets or numbers, or even all RACH resource blocks might be configured for aerial UEs with tilting of the main lobe.

Figure 8A:
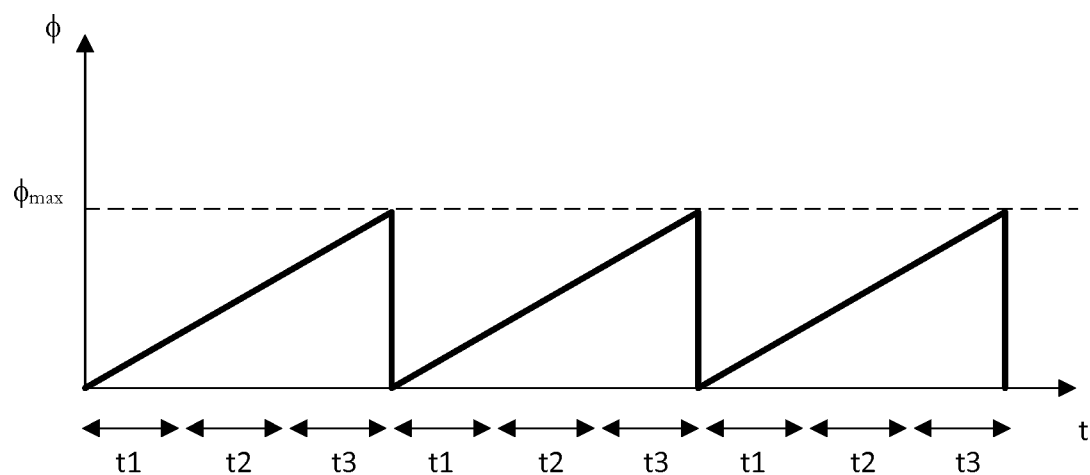
FIG. 8a shows a cyclic ramping scheme where the inclination angle of the main lobe is cyclically tilted from a minimal tilting angle to a maximal tilting angle.

FIG. 8a shows a cyclic ramping scheme where the inclination angle of the main lobe is cyclically tilted from a minimal tilting angle, here zero, to a maximal tilting angle $\phi_{max}$. The tilting of the main lobe is cyclically repeated. The tilting of the main lobe is according to a predefined scheme and is independent from a current position of an aerial UE. An aerial UE which is flying high may succeed with a RACH attempt during a time period t3 where the main lobe is tilted strongly towards high flying UEs. On the other hand, an aerial UE which is on the ground may succeed with a RACH attempt at time period t1 where the main lobe is not tilted. In FIG. 8a the tilting angle is shown to change gradually. In alternative embodiments, the tilting angle might also change step wise.

As another embodiment of tilting the main lobe, each tilted angle for each RACH resources may be randomly configured rather than ramping.

Figure 8B:
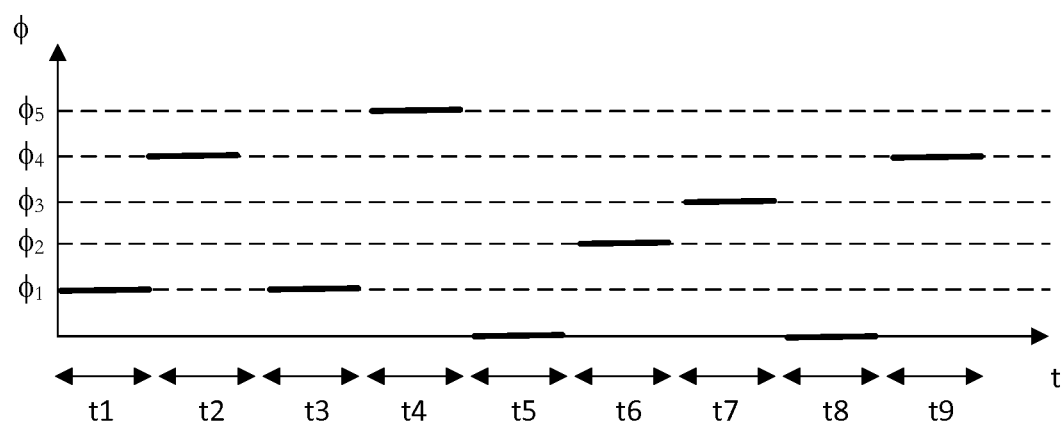
FIG. 8b shows a random tilting scheme where the inclination angle of the main lobe is randomly tilted between a minimal tilting angle and a maximal tilting angle.

FIG. 8b shows a random tilting scheme where the inclination angle of the main lobe is randomly tilted between a minimal tilting angle, here zero, and a maximal tilting angle $\phi_3$. The tilting of the main lobe is according to a random scheme and is independent from a current position of an aerial UE. During time periods t5 and t8, the main lobe is not tilted, i.e. the inclination angle is zero. During time periods t1 and t3, the main lobe is tilted according to a first inclination angle $\phi_1$. During time period t6, the main lobe is tilted according to a second inclination angle $\phi_2$, during time period t7, the main lobe is tilted according to a third inclination angle $\phi_3$, during time periods t2 and t9, the main lobe is tilted according to a fourth inclination angle $\phi_4$, and during time period t4, the main lobe is tilted according to a fifth inclination angle $\phi_5$. An aerial UE which is flying high may best succeed with a RACH attempt during a time periods t2, t4 or t9 where the main lobe is tilted strongly towards high flying UEs. On the other hand, an aerial UE which is on the ground may succeed best with a RACH attempt at time periods t1, t3, t5, or t8 where the main lobe is not or not much tilted. In FIG. 8b the tilting angle is shown to have six different configurations. In alternative embodiments, the tilting angle might have more or less numbers of different configurations.

The number of tilting angles (whether there is foreseen one angle or multiple angles), and whether or not power ramping or tilted angle ramping is enabled may depend on the area in which a base station is located.

The reception of the request of connection establishment or re-establishment may be done with a help of the system information for the aerial UE. For example the system information for the aerial UEs can include information on any radio resources among uplink radio resources (e.g. the dedicated RACH resources), which tilting of the main lobe will be configured. This allocation of radio resources may be in semi-persistent or preconfigured manner and can be configured via the base station. The aerial UE may transmit the request of connection establishment or re-establishment using the radio resources notifying to configure with tilting of the main lobe via the system information for the aerial UE. Here if enough isolation of links would be expected to have between the terrestrial and aerial UEs, the radio resources using for sending connection establishment or re-establishment from the aerial UE may be spatially multiplexed with uplink transmission from the terrestrial UE.

This tilting of the main lobe upon reception of random access transmission from the aerial UE may be at one angle or multi angles.

As described above with regard to FIGS. 2 and 3, the system information for the aerial UEs may be foreseen to include information of neighbouring base stations ("assistance information"). An aerial UE may receive this system information for the aerial UE via a neighbouring base station upon conventional cell selection/reselection. Applying the above embodiments to LTE, FD-MIMO function ("tilting of the main lobe") is not always implemented in all base stations, the system information for the aerial UE may explicitly include information for notifying an aerial UE about any base stations among the neighbouring cells, for which the FD-MIMO function is implemented.

An aerial UE can thus select a base station among the neighbouring base station for which FD-MIMO function is implemented so that the base station can receive the random access transmitted from the UAV with less interference with the terrestrial UEs in other cells as much as possible.

FIG. 9 shows an embodiment of assistance information for cell selection that is transmitted as system information from a base station, the assistance information comprising information indicating if the FD-MIMO function is implemented or not. The assistance information for cell selection CellSelectAssistenceInfo comprises an information element BaseStation1 that describes a first base station, an information element BaseStation2 that describes a second base station, and an information element BaseStation3 that describes a third base station. Information element BaseStation1 comprises an information element cellID that describes the cell id of the first base station and thus uniquely identifies the first base station. Information element BaseStation1 further comprises information elements latitude, longitude and height that describe the geographical location of the first base station. Information element BaseStation1 further comprises an information element FD-MIMO-ENABLED which indicates if the FD-MIMO function is implemented in the first base station or not. Information element BaseStation2 comprises an information element cellID that describes the cell id of the second base station and thus uniquely identifies the first base station. Information element BaseStation2 further comprises information elements latitude, longitude and height that describe the geographical location of the second base station. Information element BaseStation2 further comprises an information element FD-MIMO-ENABLED which indicates if the FD-MIMO function is implemented in the second base station or not. Information element BaseStation3 comprises an information element cellID that describes the cell id of the third base station and thus uniquely identifies the third base station. Information element BaseStation3 further comprises information elements latitude, longitude and height that describe the geographical location of the third base station. Information element BaseStation3 further comprises an information element FD-MIMO-ENABLED which indicates if the FD-MIMO function is implemented in the third base station or not.

The FD-MIMO-ENABLED information element may for example be an information element of the Boolean type, where "true" indicates that the base station is FD-MIMO enabled (i.e. it supports beam forming) and where "false" indicates that the base station does not support FD-MIMO.

The embodiments described above disclose that the system information specifically for the aerial UEs may support a procedure that allows a selected base station to receive a random access transmitted by an aerial UE with less interference with transmission of terrestrial UEs. This may for example be achieved in that the base station performs tilting of a main lobe towards an upper angle. The base station may for example tilt a main lobe in accordance with a timing of random access resources, i.e. specific random access resources groups of access resources may be attributed a respective inclination angle.

Terrestrial UEs Facing the Chiba Issue

The embodiments disclosed above may also be applied to a terrestrial UE which faces the "Chiba issue" as mention above. That is, if a terrestrial UE receives the system information including a criterium for cell selection/reselection for the aerial UE in some designated area where the terrestrial UE faces the "Chiba" issue, any unreachable random access transmission trial may be avoided. For example, if the number of random access trials reaches a threshold, a terrestrial UE may change to the cell selection/reselection criteria for the aerial UE. (e.g. a cell selection/reselection with distance basis). Or, for example, if a UE is located in a specific area (e.g. identified by CellID) that is known for facing the "Chiba" issue frequently, then the UE may be configured to perform cell selection/reselection on a distance basis instead of a conventional cell selection/reselection.

Implementation

Figure 10:
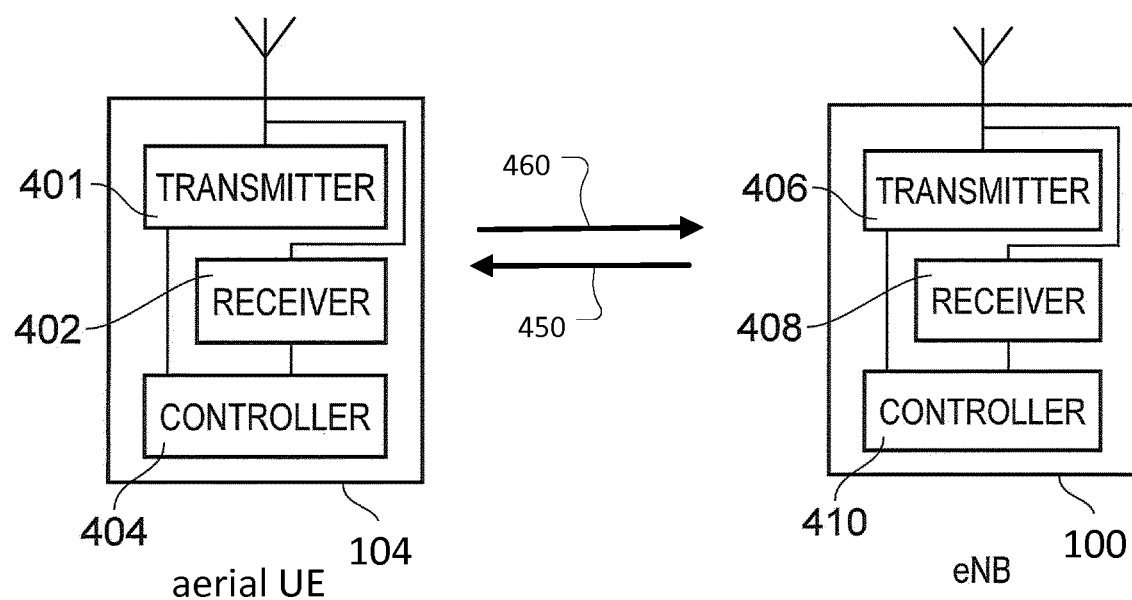
FIG. 10 shows an embodiment of a controller for a UE or for an eNB.

FIG. 10 shows a schematic block diagram of a communications path between an aerial UE 104 and an eNB 102. As shown in FIG. 8 the aerial UE 104 includes a transmitter 401 a receiver 402 and a controller 404 to control the transmission of signals to the eNB 100 and the reception. The up-link signals are represented by an arrow 460 which corresponds to that shown in FIG. 1 of signals from eNB 100. Downlink signals are shown by an arrow 450. The eNB 100 includes a transmitter 404 a receiver 408 and a controller 410 which may include a scheduler for scheduling the transmission and reception of signals on the downlink and the uplink in accordance with a wireless access interface.

Figure 11:
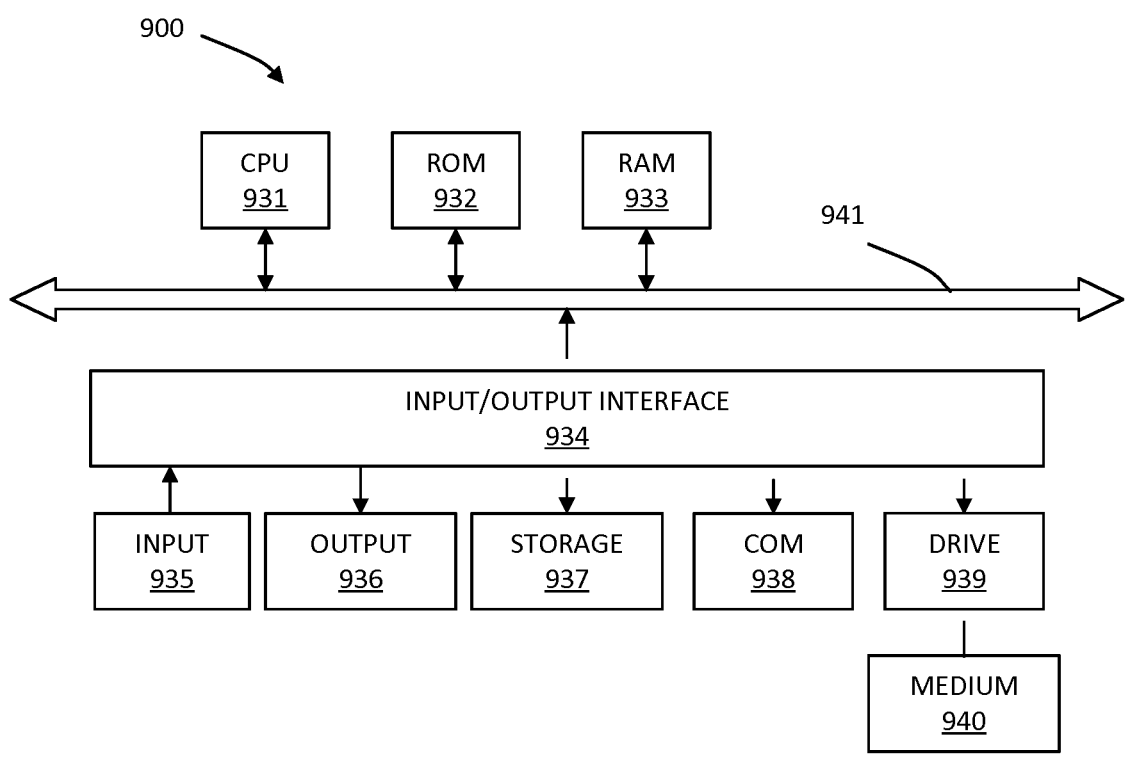
FIG. 11 presents a message flow diagram of a current handover procedure for LTE.

An embodiment of a controller 900 is described under reference of FIG. 11. This controller 900 can be implemented such that it can basically function as any type of apparatus or entity, base station or new radio base station, transmission and reception point, or user equipment as described herein. Controller 900 can thus act as controller 404 of FIG. 8 or as controller 410 of FIG. 8. The controller 900 has components 931 to 940, which can form a circuitry, such as any one of the circuitries of the entities, base stations, and user equipment, as described herein.

Embodiments which use software, firmware, programs or the like for performing the methods as described herein can be installed on controller 900, which is then configured to be suitable for the concrete embodiment.

The controller 900 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the controller 900 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. The output 936 can have a display (liquid crystal display, cathode ray tube display, light emittance diode display, etc.), loudspeakers, etc. The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc. When the controller 900 functions as a base station, the communication interface 938 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the controller 900 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 11 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An infrastructure equipment comprising circuitry configured to transmit system information specific for aerial UEs, the system information specific for aerial UEs comprising assistance information for cell selection/reselection.

(2) The infrastructure equipment of (1), wherein the assistance information for cell selection/reselection comprises information identifying the location of neighbouring base stations.

(3) The infrastructure equipment of (1) or (2), wherein the assistance information for cell selection/reselection comprises information indicating whether or not a base station supports beam forming.

(4) The infrastructure equipment of anyone of (1) to (3), wherein the assistance information for cell selection/reselection comprises information identifying radio resources among uplink radio resources for which tilting of the main lobe is enabled.

(5) The infrastructure equipment of anyone of (1) to (4), wherein the system information specific for aerial UEs comprising the assistance information for cell selection/reselection is transmitted in a system information block that is dedicated for use by aerial UEs only.

(6) The infrastructure equipment of anyone of (1) to (4), wherein the system information specific for aerial UEs comprising the assistance information for cell selection/reselection is transmitted in addition to general system information that is dedicated for use by aerial UEs and terrestrial UEs.

(7) An infrastructure equipment comprising circuitry configured to repeatedly change an inclination angle of a main lobe for reception of random access requests from aerial UEs.

(8) The infrastructure equipment of (7), wherein the circuitry is configured to perform a cyclic ramping of the main lobe.

(9) The infrastructure equipment of (7) or (8), wherein the circuitry is configured to randomly change the azimuth angle of the main lobe.

(10) The infrastructure equipment of anyone of (7) to (9), wherein the circuitry is configured to change the azimuth angle of the main lobe for a predefined set of RACH resource blocks.

(11) An electronic device comprising circuitry configured to receive system information specific for aerial UEs, the system information specific for aerial UEs comprising assistance information for cell selection/reselection.

(12) The electronic device of (11), wherein the assistance information for cell selection/reselection comprises information identifying the location of neighbouring base stations.

(13) The electronic device of (11) or (12), wherein the assistance information for cell selection/reselection comprises information indicating whether or not a base station supports beam forming.

(14) The electronic device of anyone of (11) to (13), wherein the assistance information for cell selection/reselection comprises information identifying radio resources among uplink radio resources for which tilting of the main lobe is enabled.

(15) The electronic device of anyone of (11) to (14), wherein the system information specific for aerial UEs comprising the assistance information for cell selection/reselection is transmitted in a system information block that is dedicated for use by aerial UEs only.

(16) The electronic device of anyone of (11) to (15), wherein the system information specific for aerial UEs comprising the assistance information for cell selection/reselection is transmitted in addition to general system information that is dedicated for use by aerial UEs and terrestrial UEs.

(17) The electronic device of anyone of (11) to (16), wherein the circuitry is configured to perform the cell selection/reselection based on the assistance information and according to a criterium.

(18) The electronic device of anyone of (11) to (17), wherein the assistance information for cell selection/reselection comprises information identifying the location of base stations, and wherein the circuitry is further configured to determine respective distances between the electron device and each base station identified in the assistance information.

(19) The electronic device of anyone of (18), wherein the circuitry is further configured to perform cell selection/reselection based on the distances between the electron device and the respective base stations.

(20) The electronic device of anyone of (11) to (19), wherein the circuitry is configured to perform cell selection/reselection based on the assistance information if a criterium is fulfilled, and to perform conventional cell selection/reselection if the criterium is not fulfilled.

(21) The electronic device of (20), wherein the criterium depends on the height of the electronic device.

(22) A method comprising transmitting or receiving system information specific for aerial UEs, the system information specific for aerial UEs comprising assistance information for cell selection/reselection.

(23) A method comprising repeatedly changing an inclination angle of a main lobe for reception of random access requests from aerial UEs.

(24) A computer program causing a computer and/or a processor and/or a circuitry to perform the methods of (22) or (23), when being carried out on the computer and/or processor and/or circuitry.

(25) A non-transitory computer-readable recording medium storing a computer program product causing a computer and/or a processor and/or a circuitry to perform the methods of (22) or (23), when being carried out on a computer and/or processor and/or circuitry.

The invention claimed is:

1. An infrastructure equipment comprising:
circuitry configured to
transmit system information specific for aerial UEs, the system information specific for aerial UEs comprising assistance information for cell selection/reselection by the aerial UEs,
wherein the assistance information for cell selection/reselection includes information identifying locations of a base station associated with the infrastructure equipment and one or more neighboring base stations that neighbor the base station associated with the infrastructure equipment, and
wherein the information identifying locations of the base station associated with the infrastructure equipment and the one or more neighboring base stations includes geographical positions of the base station associated with the infrastructure equipment and the one or more neighboring base stations.

2. The infrastructureequipment of claim 1, wherein the assistance information for cell selection/reselection comprises information indicating whether or not a base station supports beam forming.

3. The infrastructure equipment of claim 1, wherein the assistance information for cell selection/reselection comprises information identifying radio resources among uplink radio resources for which tilting of a main lobe is enabled.

4. The infrastructure equipment of claim 1, wherein the system information specific for aerial UEs comprising the assistance information for cell selection/reselection is transmitted in a system information block that is dedicated for use by aerial UEs only.

5. The infrastructure equipment of claim 1, wherein the system information specific for aerial UEs comprising the assistance information for cell selection/reselection is transmitted in addition to general system information that is dedicated for use by aerial UEs and terrestrial UEs.

6. An electronic device in an aerial UE, comprising:
circuitry configured to
receive system information specific for aerial UEs, the system information specific for aerial UEs comprising assistance information for cell selection/reselection by the electronic device.
wherein the assistance information for cell selection/reselection includes information identifying locations of a base station having transmitted the system information and one or more neighboring base stations that neighbor the base station having transmitted the system information, and
wherein the information identifying locations of the base station having transmitted the system information and the one or more neighboring base stations includes geographical positions of the having transmitted the system information and the one or more neighboring base stations.

7. The electronic device of claim 6, wherein the assistance information for cell selection/reselection comprises information indicating whether or not each of the base station stations support beam forming.

8. The electronic device of claim 6, wherein the assistance information for cell selection/reselection comprises information identifying radio resources among uplink radio resources for which tilting of a main lobe is enabled.

9. The electronic device of claim 6, wherein he system information specific for aerial UEs comprising the assistance information for cell selection/reselection is transmitted in a systef r information block that is dedicated for use by aerial UEs only.

10. The electronic device of claim 6, wherein the circuitry is configured to perform the cell selection/reselection based on the assistance information and according to a criterium.

11. The electronic device of claim 6,
wherein the circuitry is configured to determine respective distances between the electronic device and each of the base stations identified in the assistance information.

12. The electronic device of claim 11, wherein the circuitry is configured to perform the cell selection/reselection based on the distances between the electronic device and the respective base stations.

13. The electronic device of claim 6, wherein the circuitry is configured to
perform the cell selection/reselection based on the assistance information in a first case where a criterium is fulfilled, and
perform conventional cell selection/reselection in a second case where the criterium is not fulfilled.

14. A method comprising:
transmitting or receiving system information specific for aerial UEs, the system information specific for aerial UEs comprising assistance information for cell selection/reselection by at least one of the aerial UEs,
wherein the assistance information for cell selection/reselection includes information identifying locations of a base station having transmitted the system information and one or more neighboring base stations that neighbor the base station having transmitted the system information, and
wherein the information identifying locations of the base station having transmitted the system information and the one or more neighboring base stations includes geographical positions of the having transmitted the system information and the one or more neighboring base stations.

* * * * *